(12) United States Patent
Matusik et al.

(10) Patent No.: US 11,097,464 B2
(45) Date of Patent: Aug. 24, 2021

(54) SYSTEMS, DEVICES, AND METHODS FOR INKJET-BASED THREE-DIMENSIONAL PRINTING

(71) Applicant: Massachusetts Institute of Technology, Cambridge, MA (US)

(72) Inventors: Wojciech Matusik, Lexington, MA (US); Wenshou Wang, Quincy, MA (US); Kiril Vidimce, Cambridge, MA (US); Javier Ramos, Boston, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 822 days.

(21) Appl. No.: 15/687,211

(22) Filed: Aug. 25, 2017

(65) Prior Publication Data

US 2018/0056582 A1    Mar. 1, 2018

Related U.S. Application Data

(60) Provisional application No. 62/380,309, filed on Aug. 26, 2016.

(51) Int. Cl.
*B29C 41/08* (2006.01)
*B29C 41/52* (2006.01)
(Continued)

(52) U.S. Cl.
CPC .......... *B29C 64/112* (2017.08); *B29C 64/209* (2017.08); *B29C 64/307* (2017.08);
(Continued)

(58) Field of Classification Search
CPC ....... B29C 41/08; B29C 41/52; B29C 64/106; B29C 64/112; B29C 64/386;
(Continued)

(56) References Cited

U.S. PATENT DOCUMENTS

| | | | |
|---|---|---|---|
| 2004/0141042 A1* | 7/2004 | Silverbrook | B33Y 50/02 347/102 |
| 2005/0015175 A1* | 1/2005 | Huang | B29C 64/112 700/121 |

(Continued)

FOREIGN PATENT DOCUMENTS

EP    1498277 A1    1/2005
WO    2016/193934 A1    12/2016

*Primary Examiner* — Leo B Tentoni
(74) *Attorney, Agent, or Firm* — Occhiuti & Rohlicek LLP

(57) ABSTRACT

Devices and methods are described that provide printing of three-dimensional objects using reactive materials such as materials that result in a polyurethane formulation. Three-dimensional printing in accordance with the present disclosure can be performed using an inkjet printer or other systems that deposit or dispense material. A formulation made up of two or more reactive materials and, optionally, one or more UV-curable materials is also provided. The materials can be jetted based on a desired configuration to achieve a maximum reaction between materials, and can be based on desired jetting or molar ratios. By heating or applying energy on the jetted materials, their reaction and related solidifying can be accelerated. Corrective printing is also provided for, and can be used at desired intervals to eliminate printing errors relative to the object as modeled. Systems and methods used in conjunction with all of the same are provided.

23 Claims, 5 Drawing Sheets

(51) Int. Cl.
*C08G 18/10* (2006.01)
*C08G 18/18* (2006.01)
*C08G 18/42* (2006.01)
*C08G 18/44* (2006.01)
*C08G 18/48* (2006.01)
*B29C 64/112* (2017.01)
*B29C 67/24* (2006.01)
*B33Y 10/00* (2015.01)
*B33Y 30/00* (2015.01)
*B33Y 50/02* (2015.01)
*B33Y 70/00* (2020.01)
*B29C 64/307* (2017.01)
*B29C 64/209* (2017.01)
*B29C 64/393* (2017.01)
*B29K 105/00* (2006.01)
*C08G 18/32* (2006.01)
*C08G 18/24* (2006.01)
*B29K 75/00* (2006.01)

(52) U.S. Cl.
CPC .......... *B29C 64/393* (2017.08); *B29C 67/246* (2013.01); *B33Y 10/00* (2014.12); *B33Y 30/00* (2014.12); *B33Y 50/02* (2014.12); *B33Y 70/00* (2014.12); *B29K 2075/00* (2013.01); *B29K 2105/0002* (2013.01); *B29K 2105/0005* (2013.01); *B29K 2105/005* (2013.01); *B29K 2105/0011* (2013.01); *B29K 2105/0014* (2013.01); *B29K 2105/0032* (2013.01); *B29K 2105/0047* (2013.01); *C08G 18/1825* (2013.01); *C08G 18/244* (2013.01); *C08G 18/3203* (2013.01); *C08G 18/3206* (2013.01)

(58) Field of Classification Search
CPC . B29C 64/393; B29C 67/246; B29K 2075/00; B29K 2105/0002; B29K 2105/0005; B29K 2105/0011; B29K 2105/0014; B29K 2105/0032; B29K 2105/0047; B29K 2105/005; B33Y 10/00; B33Y 50/00; B33Y 50/02; C08G 18/10; C08G 18/18; C08G 18/125; C08G 18/244; C08G 18/3203; C08G 18/3206; C08G 18/42; C08G 18/44; C08G 18/48
USPC .... 264/40.1, 240, 308, 309, 331.19; 528/48, 528/52, 58, 59, 60, 61, 65, 68, 69, 85
See application file for complete search history.

(56) References Cited

U.S. PATENT DOCUMENTS

2015/0352872 A1* 12/2015 Conrow ................ B29C 64/112
                                                                  347/14
2017/0185072 A1*  6/2017 Nencka ................... B33Y 10/00
2017/0321083 A1* 11/2017 Fenn ..................... B29C 64/112

* cited by examiner

SYSTEMS, DEVICES, AND METHODS FOR INKJET-BASED THREE-DIMENSIONAL PRINTING

CROSS REFERENCE TO RELATED APPLICATION

The present application claims priority to and the benefit of U.S. Provisional Application No. 62/380,309, filed on Aug. 26, 2016, and titled "Systems, Devices and Methods for Inkjet-Based Three-Dimensional Printing," the content of which is incorporated herein by reference in its entirety.

FEDERALLY SPONSORED RESEARCH

The present invention was made with government support under Grant No. 024252-00001, awarded by Defense Advanced Research Projects Agency (DARPA), and Grant No. 023131-00001, (sponsor award ID: IIS-1409310), awarded by the National Science Foundation (NSF). The Government has certain rights in the invention.

FIELD

The present application relates to systems, devices, and methods for inkjet-based three-dimensional printing, and more specifically to fabrication of three-dimensional objects via inkjet printing of reactive components.

BACKGROUND

Additive manufacturing (AM) or three-dimensional (3D) printing is a rapid prototyping and fabrication technology with which three-dimensional objects can be fabricated through layer-by-layer deposition. Additive manufacturing is rapidly gaining popularity in a variety of markets including automotive, aerospace, medical devices, pharmaceuticals, and industrial tooling.

The growth of additive manufacturing processes has led to various iterations of such processes being commercialized, including extrusion processes, such as fused deposition Modeling® (FDM®), light polymerization processes, such as stereolithogrpahy (SLA) and multijet/polyjet, powder bed fusion processes, such as selective laser sintering (SLS) or binder jetting, and lamination processes, such as laminated object manufacturing (LOM). Nevertheless, despite this growth and rapid progress, additive manufacturing has limitations, such as the materials that can be used in conjunction with such processes. There are limited types of materials, and the performance of the materials limits the efficiency and quality of the resulting objects.

For instance, to print plastic three-dimensional objects, a large class of materials can be either underrepresented or not available for use. That is, elastomers printed using the FDM® or SLS processes are generally semi-rigid and do not typically have a good elongation at break. Elastomers printed using multijet/polyjet processes are typically less functional and based on fragile, ultraviolet (UV)-curable acrylates. Moreover, there is only a narrow set of materials that are both high-temperature resistant and chemically resistant enough to allow them to be used to print three-dimensional objects employing techniques like SLA and FDM®.

Polyurethane is a widely used material that can be formulated to be both rigid and elastomeric, and it is highly temperature and chemically resistant. Polyurethane is often used to fabricate medical devices, shoes, clothing, tires, coatings, packaging, sealants, among other objects. Several polyurethane-based materials exist that can be used for three-dimensional printing, including thermoplastic polyurethane (TPU) filament for FDM® printing and TPU powder for SLS three-dimensional printers. However, none of these polyurethane-based materials can be used for three-dimensional printers that are high in resolution and contact-free, such as inkjet printers. Although it is possible to print two-dimensional structures using polyurethane diluted with solvents at a low solid-to-solvent ratio, it is not feasible or practicable to print three-dimensional and large structures.

Accordingly, there is a need for systems, devices, and methods for efficiently fabricating highly accurate three-dimensional objects by inkjet printing of reactive materials including those used to generate polyurethane. Moreover, there is a need for such systems, devices, and methods to include formulation, deposition, and/or curing that results in solid or substantially solid polyurethane to form a wide range of polyurethane materials.

SUMMARY

Systems, devices and methods are provided for three-dimensional printing of reactive materials. In some example embodiments, the three-dimensional printing is performed using an inkjet printer equipped with printheads and nozzles to dispense respective parts in accordance with a formulation configured to create a solid object. For instance, the formulation may be a multi-part formulation for polyurethane, wherein each printhead and nozzle of the printer ejects one of the parts onto a build platform of the printer. The parts are ejected in accordance with a desired printing pattern configured to, among other things, maximize the surface interaction area between droplets of different parts of the multi-part formulation and to achieve a desired molar ratio between droplets. Moreover, the droplets are ejected layer by layer until the object is generated.

In one exemplary method for printing in three dimensions, the method includes ejecting a first fluid from a first nozzle onto a surface and ejecting a second fluid from a second nozzle towards the surface. The first fluid includes a first material and the second fluid includes a second material, with the second material being configured to react with the first material to form a printed material. The method further includes repeating the steps of ejecting the first and second fluid in layers to form an object. The first fluid and the second fluid are formulated and ejected such that the molar ratio between the first and second fluids substantially meets a target molar ratio (i.e., a difference between the target molar ratio and the ejected molar ratio should be minimized), and after the first and second fluids are ejected from first and second nozzles, the resulting printed material solidifies so that the formed object is solid.

Ejecting a first fluid from a first nozzle onto a surface can result in the formation of a first layer. Likewise, ejecting a second fluid from a second nozzle towards the surface can result in the formation of a second layer. The first fluid and the second fluid can be formulated to achieve a target reaction rate between the first fluid and the second fluid. A ratio of an amount of the first fluid to an amount of the second fluid can be approximately in the range of about 80:20 to about 20:80. In some embodiments, each of the first and second fluids can have approximately five (5) percent solvent total volume or less associated with it. In fact, sometimes each of the first and second fluids can be solvent-free. A catalyst can be included as part of at least one of the first fluid and the second fluid.

A number of different materials are provided for in the present disclosure, and a person skilled in the art, in view of the present disclosures, may be able to derive other suitable materials for use in conjunction with the recited methods (and systems). In some embodiments the printed material is polyurethane, with the first material including an isocyanate functional group, and the second material including at least one of a polyol functional group that is reactive with the isocyanate functional group, an amine that is reactive with the isocyanate functional group, a hydroxyl that is reactive with the isocyanate functional group, and a mixture of any of a polyol functional group, an amine, and a hydroxyl, the mixture being reactive with the isocyanate functional group.

The method can further include heating the layers of the first and second fluids after the first and second fluids have been ejected from the respective first and second nozzles. Ejecting a first fluid from a first nozzle onto a surface can include ejecting a first fluid from a plurality of first nozzles onto a surface, and likewise, ejecting a second fluid from a second nozzle towards the surface can include ejecting a second fluid from a plurality of second nozzles towards the surface. In some embodiments, the first and second materials can be ejected in a pattern that can be pre-calculated and that is configured to achieve desired or optimal characteristics. For instance, the first and second materials can be ejected according to a pattern that optimizes one or more characteristics of the jetted materials, such as their molar ratio and/or interaction area. Such patterns can include, for example, patterns that (i) optimize the interaction area between the droplets of the first material and the droplets of the second material, and preserve a given molar ratio between the droplets of the first material and the droplets of the second material; (ii) optimize the molar ratio between the droplets of the first material and the droplets of the second material; and/or (iii) optimize the molar ratio and the interaction area between the droplets of the first material and the droplets of the second material. Most any molar ratio can be achieved, and thus, to the extent the presently described methods and systems describe those that are approximately 50-50, a person skilled in the art will recognize that, in view of the present disclosures, many other ratios are possible. Likewise, many configurations of the printed material can be achieved, whether a particular pattern, partially a pattern, or in any other arrangement made possible by the present disclosures. Non-limiting examples of patterns for ejecting materials, such as a first material and a second material, include a checkered pattern and a shifting checkerboard pattern. The checkerboard and shifting checkerboard patterns are merely two examples of possible patterns.

In some embodiments, a third fluid can be ejected from a third nozzle towards the surface. The third fluid can include a third material that is an ultraviolet (UV)-curable material. In some such embodiments, the first and second fluids can be printed according to a first pattern and the third fluid can be printed according to a second pattern.

Various other components can be operated in conjunction with the provided methods (and systems). In some embodiments, the method can include operating a controller to adjust at least one of a droplet size of at least one of the first or second fluids ejected from the respective first or second nozzle, or a printing pattern that results from ejecting the first and second fluids to optimize a contact area of the printed object. Alternatively, or additionally, the method can include operating a feedback loop to analyze a geometry of the printed material in real time and generating a compensation layer of material to compensate for errors identified in the operating step.

The height of the formed object can be of virtually any size (e.g., at least about 1 millimeter, at least about 1 centimeter, or higher), and demonstrates that the formed object is a three-dimensionally printed object, as opposed to printing that occurs in a two-dimensional setting. A combined molecular weight of the first fluid and the second fluid can be less than a molecular weight of the printed material that results after the first and second materials react together.

One exemplary embodiment of a system for printing in three dimensions includes one or more first nozzles configured to eject a first fluid, a first chamber in fluid communication with the one or more first nozzles, one or more second nozzles configured to eject a second fluid, a second chamber in fluid communication with the one or more second nozzles, and a fluid heater. The first chamber is configured to store the first fluid, the second chamber is configured to store the second fluid, and the fluid heater is configured to heat at least one of the first and second chambers to heat fluid disposed in the respective chamber prior to such fluid being ejected from the respective one or more first or second nozzles. Further, at least one of the first and second fluids has a catalyst added to it during at least one of: prior to being disposed in the respective first or second chamber, while being disposed in the respective first or second chamber, or prior to being ejected through the respective one or more first or second nozzles. The fluid heater can be configured to heat both the first and second chambers.

The system can include a controller that is configured to operate the one or more first and second nozzles to result in fluid printed from such nozzles being deposited in a complementary pattern (e.g., checkered), such that equal or non-equal ratios of materials can be deposited from the first and second nozzles. In some such embodiments, the controller can be configured to operate the one or more first and second nozzles to result in fluid printed from the nozzles being deposited in a shifting checkerboard pattern to maximize a number of layers with which a printer layer interacts.

A heater configured to move vertically with respect to a length of the one or more first and second nozzles can also be provided. Such a heater can heat fluid deposited from the one or more first and second nozzles after it has been deposited by the one or more first and second nozzles. In some embodiments, the system can include a catalyst chamber that is in fluid communication with at least one of the first and second chambers. This can allow the catalyst to be added to at least one of the first and second fluids that are stored in their respective chambers.

BRIEF DESCRIPTION OF DRAWINGS

The present application will be more fully understood from the following detailed description taken in conjunction with the accompanying drawings, in which.

DETAILED DESCRIPTION

Figure 1:
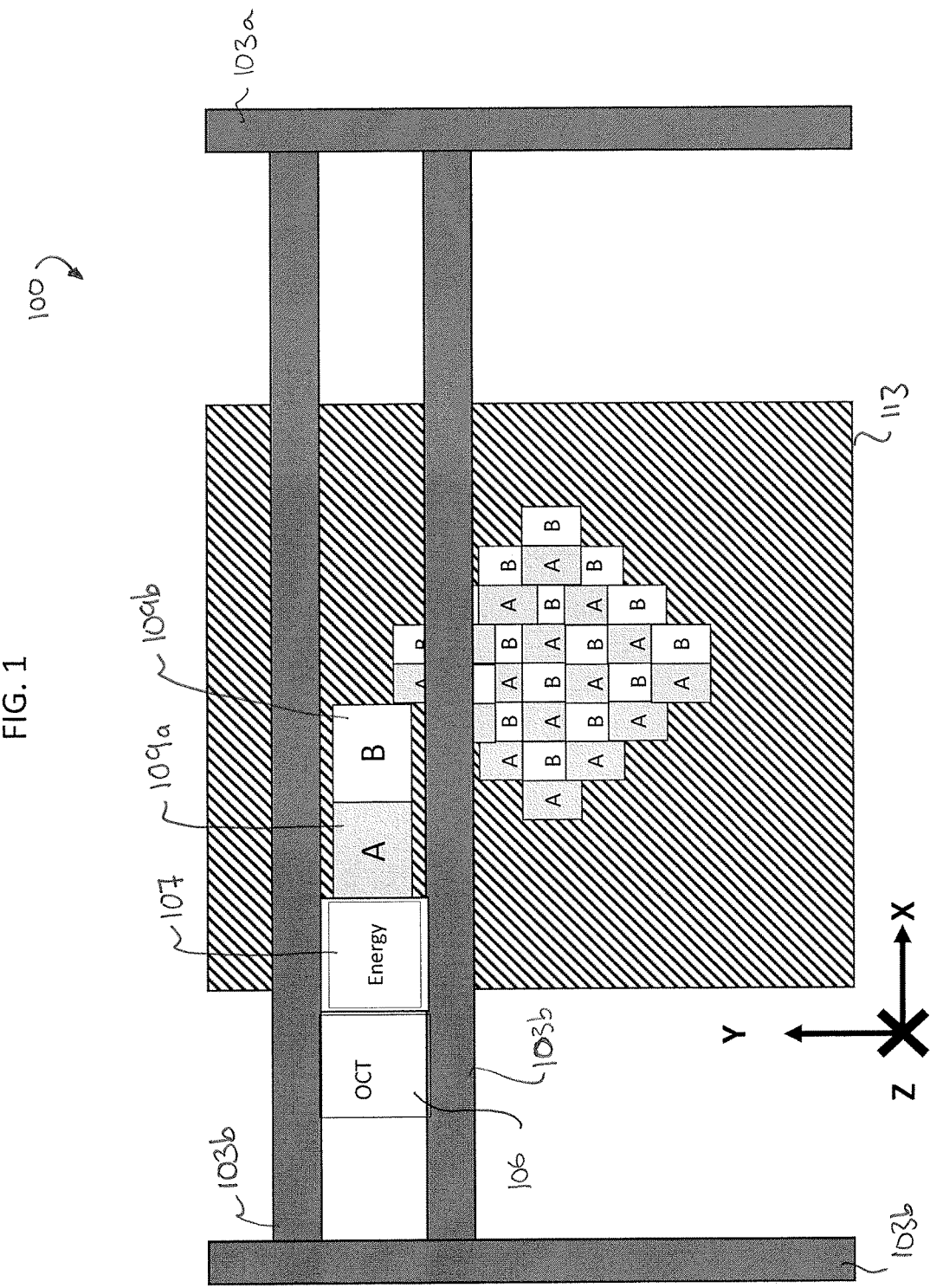
FIG. 1 is a top schematic view of one exemplary embodiment of a three-dimensional printing device.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-numbered components of various embodiments generally have similar features when those components are of a similar nature and/or serve a similar purpose.

The present disclosure includes some illustrations and descriptions that include prototypes or bench models. A person skilled in the art will recognize how to rely upon the present disclosure to integrate the techniques, systems, devices, and methods provided for herein into a product, such as a consumer-ready, factory-ready, or lab-ready three-dimensional printer.

Exemplary embodiments of the present disclosure provide for printing three-dimensional polyurethane objects. In some exemplary embodiments, the polyurethane objects are generated using a two part formulation that is one part isocyanate and one part hydroxyl, amine, or both hydroxyl and amine. Other suitable materials are provided for below. To achieve a desired reaction between the two parts of the polyurethane formulation, a catalyst may be added to each of the parts. This polyurethane formulation is configured such that it may be printed by an inkjet printer via printhead nozzles. The polyurethane formulation may be printed by other systems that deposit or dispense material. While a polyurethane formulation is described herein, in some exemplary embodiments, the formulation to be printed may include two or more reactive materials and, optionally, one or more UV-curable materials. The printing process includes determining a desired formulation to identify target materials, jetting ratios, and molar ratios. The materials can be jetted via the nozzles of the printer in accordance with a predetermined configuration or pattern to achieve a maximum reaction between the materials. Heating and/or energy may be used to speed up the reaction and/or solidifying of the materials. Corrective printing can be performed at desired intervals during the printing process in order to eliminate differences between the printed object and the object as modeled. As described in further detail below, the corrective printing can be performed using a feedback loop that can enhance the accuracy or similarity of the printed object relative to the modeled object that indicates the expected final printed object.

The disclosure first describes non-limiting, exemplary embodiments of printing devices and systems, then describes the materials that are used to formulate a printed object that can include polyurethane, and then various processes for printing are provided.

Printer

Figure 2:
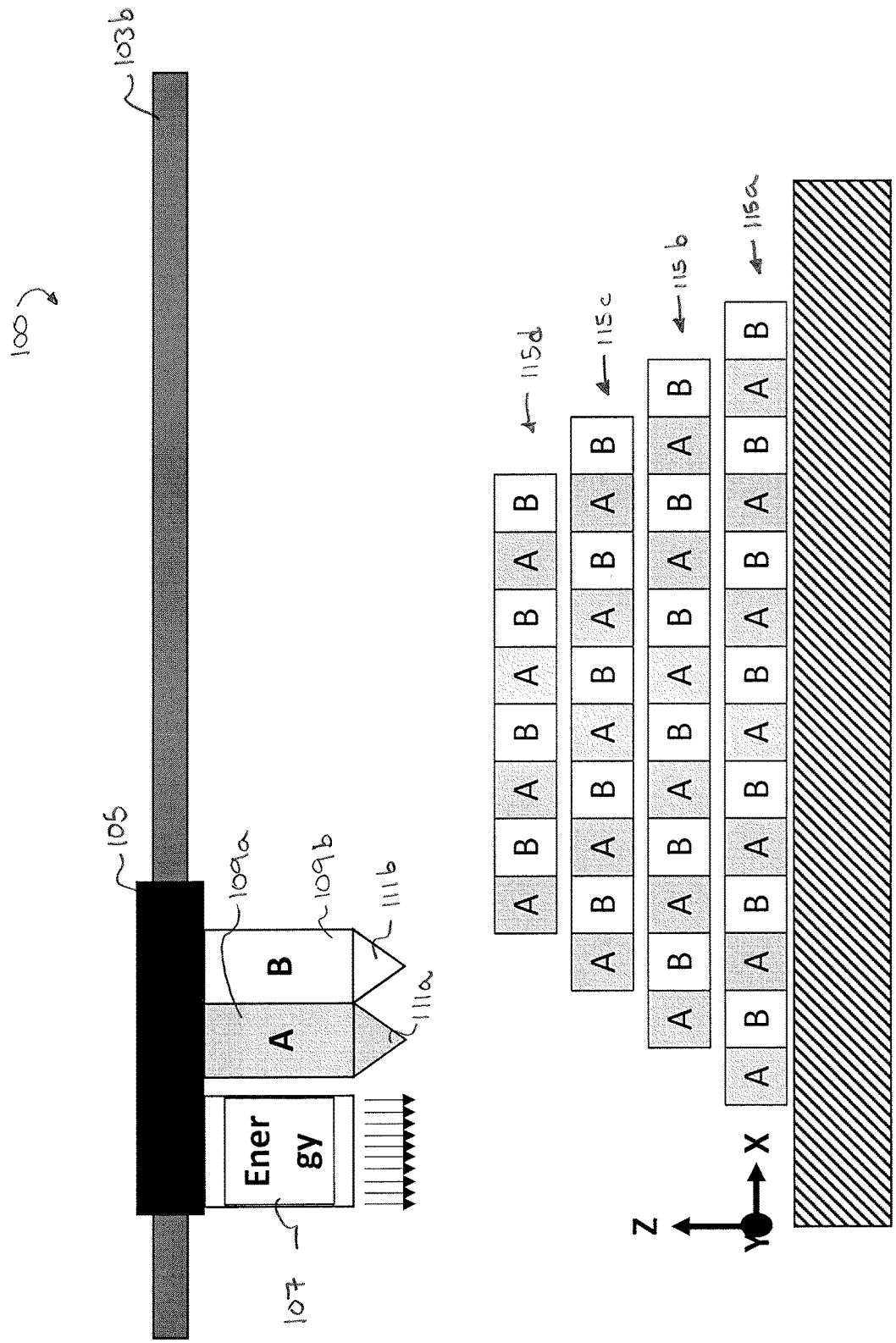
FIG. 2 is a front schematic view of the printing device of FIG. 1.

FIGS. 1 and 2 schematically illustrate one exemplary embodiment of an inkjet printer 100 for use in conjunction with printing three-dimensionally. It should be understood that, in alternative embodiments, the printer 100 may be any system or device adapted to print material by way of depositing or dispensing the material, such as a drop-based system, a syringe-based extrusion system, and/or a valve-based dispensing or jetting system or device, among other types of systems or devices known to those skilled in the art or otherwise capable of depositing or dispensing material. Some non-limiting examples of such systems that have inkjet printheads include systems from companies like Ricoh®, Dimatix®, and Epson®, and some non-limiting examples of such systems that have valves include the PICO® Pulse™ jet valve from Nordson®.

As shown, the printer 100 includes a motion system 103 on which a carriage 105, an imaging device 106, an energy source 107, and printheads 109a and 109b are disposed. In some embodiments, the motion system 103 is a gantry, such as an H-frame gantry, that is connected or built atop a printer frame (not illustrated) of the printer 100. The motion system 103 may include stationary rods 103a and a movable bridge 103b. The bridge 103b is movably attached or connected to the rods 103a such that it can move or be driven along the Y-axis. Although not shown, the motion system 103 may include components such as motors, drive belts, idler pulleys, and other mechanisms known to those skilled in the art to control the movement and positioning of the motion system 103, and more particularly the carriage 105 and associated components.

The carriage 105, energy source 107, and printheads 109a and 109b can be movably attached or connected to the bridge 103b of the motion system 103. The carriage 105, energy source 107, and printheads 109a and 109b may be connected to one another. In some embodiments, one or more of the energy source 107 and printheads 109a and 109b are attached to the carriage 105. The carriage 105 can be moved or driven back and forth across the bridge 103b along the X-axis. Such movement of the carriage 105 causes the energy source 107 and printheads 109a and 109b, along with any other components attached thereto, to be driven along the same X-axis on which the carriage 105 moves.

The movable attachment of (1) the bridge 103b on the rods 103a, (2) the carriage 105 on the bridge 103b, and (3) the energy source 107 and printheads 109a and 109b along the bridge 103b, enables the printheads 109a and 109b to be positioned on desired coordinates or locations such that a fluid or material can be jetted atop or above a build platform 113, on which the three-dimensional object, such as a polyurethane object, is printed and/or fabricated. In some embodiments, the build platform 113 is or may include a supporting structure, also referred to and/or known as a printed support structure, which is configured to support the fabrication of the object during printing. It should be understood that the printer support structure is removed and/or separated from the printed object at a time after completion of the printing process. The time post-printing when the printer support structure is removed and/or separated from the object is at least long enough to not damage or impact the printed object, as known to those of skill in the art. A person skilled in the art will understand a variety of other structures and configurations that can be used to allow the carriage 105 and associated components (e.g., the energy source 107 and printheads 109a and 109b) to move with respect to a surface onto which printing is to occur (e.g., the build platform 113) in order to print in conjunction with the present disclosures.

Figure 4:
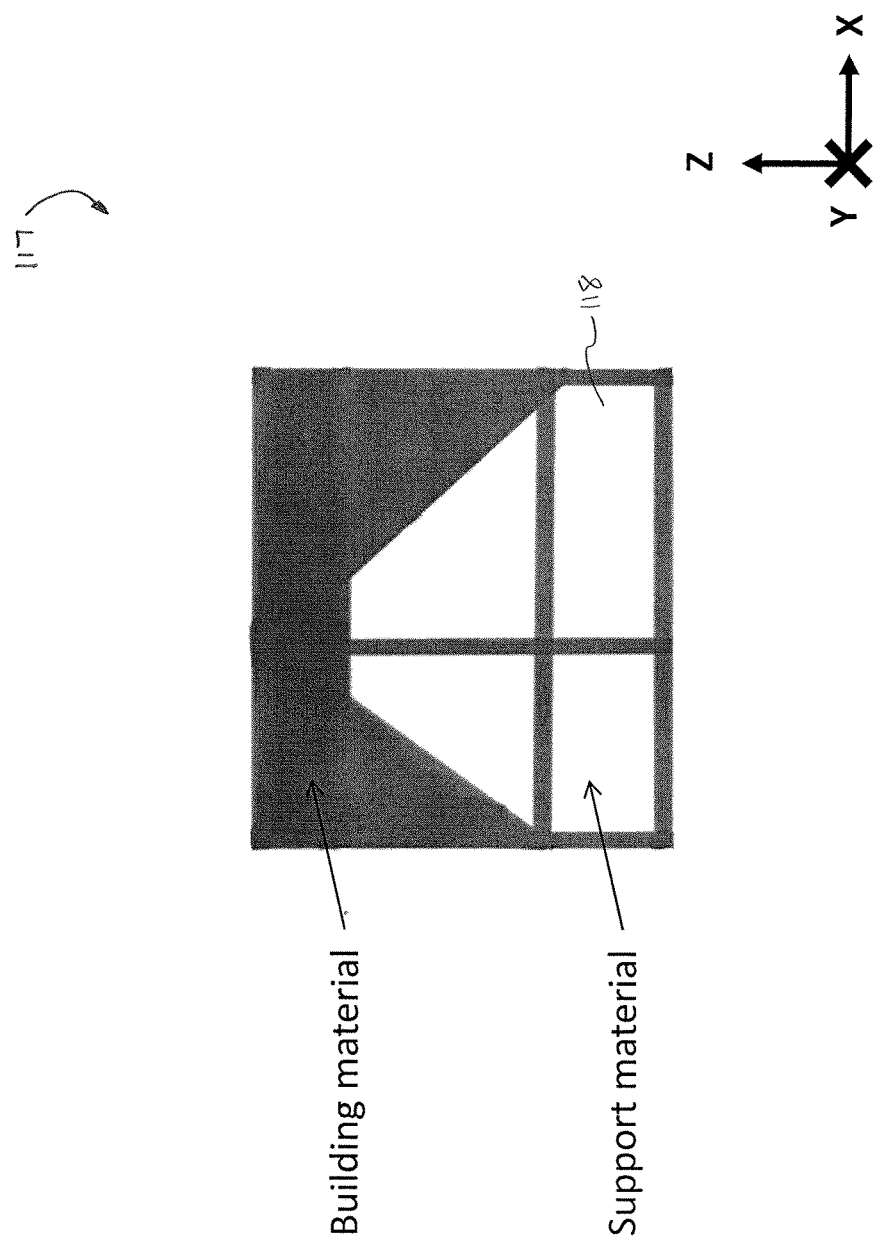
FIG. 4 is a side view of one exemplary embodiment of a supporting structure for use in conjunction with, or as part of, a three-dimensional printing device.

The supporting structure can be made up of a support material or materials selected to react and/or interact with the plurality of building materials output from the printheads 109a and 109b to generate the three-dimensional object. More specifically, FIG. 4 illustrates one non-limiting example of a supporting structure 117. The supporting structure 117 includes a support material 118, on or around which a building material 119 can be jetted. In some embodiments, the support material 118 is printed onto or atop the build platform 113 via the printheads 109a and/or 109b prior to or during the printing of the three-dimensional object. The support material 118 and/or the building material 119 may be selected based on the characteristics of one another such that a desired reaction therebetween can be achieved in order to print the desired object. For example, the support material 118 and the building material 119 may be selected such that they can be separated from one another when printing is completed, thereby yielding the desired object. Non-limiting examples of combinations of a support material and a building material that may be selected for printing include: (1) a water or solvent soluble material and a non-water or non-solvent soluble material; and (2) a heat resistant material and a material that melts at a substantially lower temperature relative to the heat resistant material.

The printheads 109a and 109b include corresponding nozzles 111a and 111b, through which materials A and B are respectively output or jetted onto the build platform 113. It should be understood that materials A and B may also interchangeably be referred to herein as "parts," each jetted part representing a fraction of a multi-part material formulation. As described in further detail below, the materials A and B are output in a desired pattern, ratio, speed, droplet size, etc., to achieve a desired chemical reaction resulting in an optimal material for the printed object. That is, the interaction and/or chemical reaction between the materials A and B cause the materials to solidify and form a solid or semi-solid portion of an object. A more detailed description of solid and semi-solid materials is presented below in connection with FIG. 5.

Figure 3:
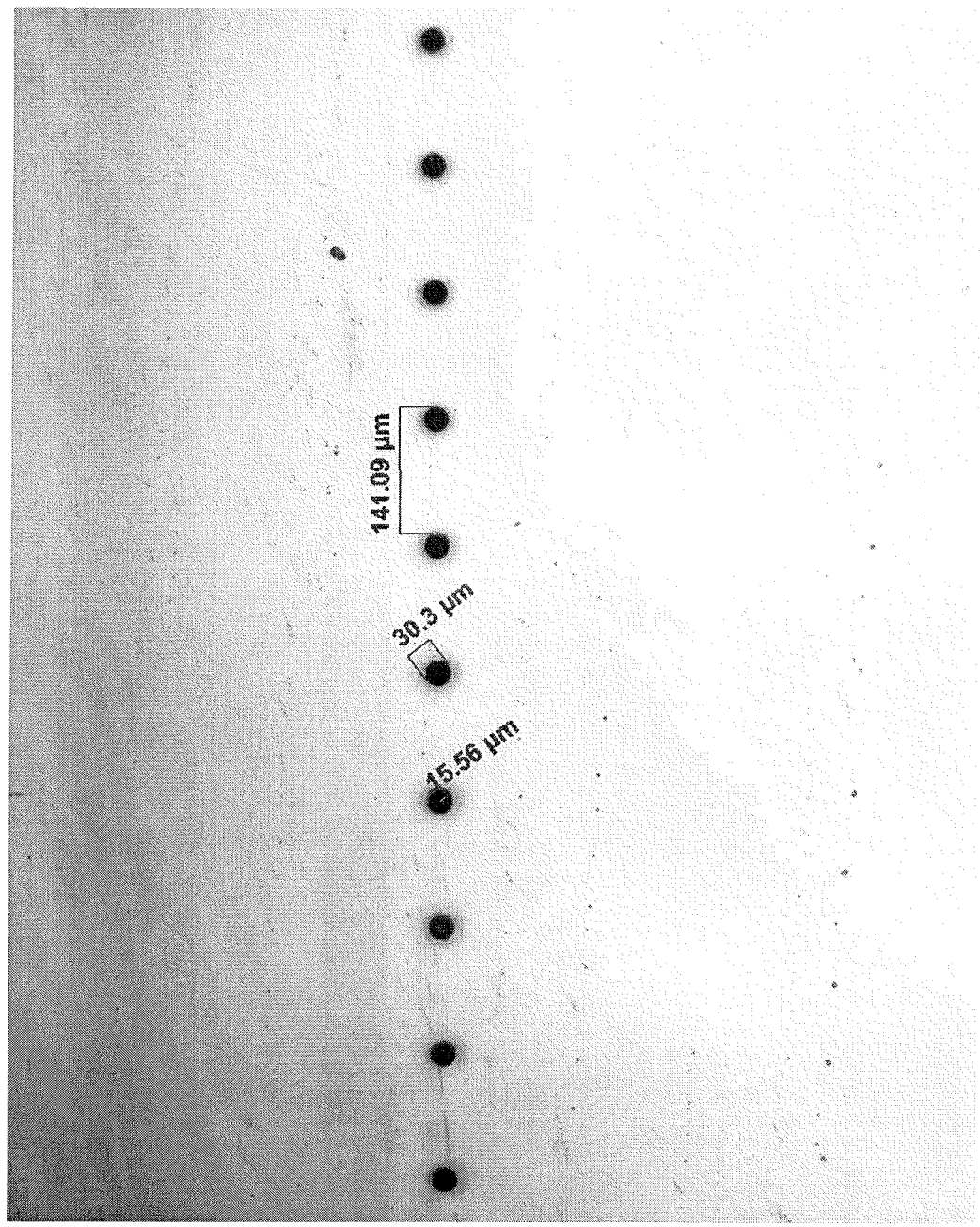
FIG. 3 is a microscopic view of one exemplary embodiment of printhead nozzles for use in conjunction with a three-dimensional printing device.

FIG. 3 illustrates non-limiting examples of printhead nozzles, as viewed under a microscope, that can be used in conjunction with the presently disclosed printer systems and devices to jet or otherwise output droplets of material. FIG. 3 also illustrates non-limiting examples of radius and diameter dimensions of printhead nozzles. While many different sizes of nozzles can be used, in some embodiments nozzles can have a diameter approximately in the range of about 5 μm to about 100 μm, and a radius approximately in the range of about 2 μm to about 50 μm. In the illustrated embodiment, exemplary nozzles that are labeled include a nozzle having a radius of about 15.56 μm, and thus a diameter of about 30.3 μm, and the other illustrated nozzles have comparable diameters and radii. It should be understood, however, that the input waveform of nozzles can be tuned to adjust the volume and/or size of the droplets that are dispensed, such that two nozzles of approximately the same dimensions can output droplets of different sizes. Likewise, nozzles of different sizes, which can likewise have an input waveform thereof tuned to adjust a volume and/or size of the outputted droplets, can be used to assist in adjusting a size of outputted droplets. The size of nozzles (or a group of nozzles) and/or desired droplet sizes can be selected based on a variety of factors, including but not limited to the other components with which the nozzles are being used, the configuration of the material being printed, and the desired output that is printed, among other factors.

Moreover, FIG. 3 illustrates a non-limiting example of spacing that can be disposed between nozzles, and thus outputted droplets. In some embodiments a spacing between two nozzles in the same row and/or the same column can be approximately in the range of about 50 μm to about 1000 μm. In the illustrated embodiment, a non-limiting, labeled spacing is about 141.09 μm.

Although only two printheads 109a and 109b and nozzles 111a and 111b are shown in FIGS. 1 and 2, it should be understood that other printer, printhead, and nozzle configurations can be used to perform the printing described herein. In some embodiments, a printer including a single printhead can be used to jet multiple materials. For instance, the single printhead may include a single nozzle via which multiple materials are jetted one after the other, or the single printhead may include multiple nozzles via which respective materials are jetted. In embodiments in which the printer includes two or more nozzles, each nozzle is configured to output or jet a respective material. In examples described herein, the materials A and B output by the nozzles 111a and 111b are materials specifically formulated to prepare polyurethane in a form usable for jetting, ejecting, outputting, or dispensing from printheads, nozzles, syringes, and/or valves such as the nozzles 111a and 111b. Such a polyurethane formulation is described below in further detail. Although polyurethane is described in embodiments herein, it should be understood that the two or more materials to be jetted via nozzles 111a and 111b can be any two or more reactive materials, including but not limited to epoxies, hydrogels, and silicone. It should be understood that terms like jetting, outputting, ejecting, and dispensing as they are used to reference printing materials are used interchangeably herein.

To speed up the reaction between two materials, such as parts A and B in the polyurethane formulation described herein, a substrate onto which the materials are jetted may be heated. For example, a heating source (alternative or additional to the heater configured to heat the chambers storing the formulation parts described above) can be provided with the printer such that heat can be applied to the printed layers at desired intervals. The heating source may be attached to the carriage 105 and driven in the same way as the printheads 109a and 109b. In embodiments in which the heat is generated by infrared radiation, the heating source may be the energy source 107 that is connected to the carriage 105. In other embodiments the heat may be generated by a ceramic heater and fan, attached and/or connected to the printer 100 or the carriage 105. A variety of other configurations are known to those skilled in the art, and thus additional examples of three-dimensional printing set-ups is unnecessary.

In some embodiments, additional materials can be output via corresponding additional nozzles of the printer. In some embodiments, an additional material may be a material that is not reactive with other of the jetted reactive materials. For example, in one embodiment, the additional material that is jetted by the printer may be a UV-curable material. A UV-curable material or the like can be used to print complex and/or overhead structures and geometry. In such embodiments, when a UV-material is jetted by an additional nozzle of the printer, the energy source 107 of the printer 100 can be used to solidify the UV-curable material into a desired solid or semi-solid portion of an object. That is, the energy source 107 can output heat or energy at a desired temperature and/or rate such that the UV-curable materials can solidify at a desired speed. As shown in FIG. 2, in some embodiments, the energy output by the energy source 107 is output in a distal direction towards the build platform 113. The configuration of the movement of the carriage 107 along the X-axis, and thus of the printheads and the energy source 107 of the printer, is such that the energy source 107 outputs its energy onto the latest-jetted droplets of material.

While more specifics of the printer 100, materials, and printing process are described below, a general description of fabricating a three-dimensional polyurethane object by inkjet printing is now provided.

A desired object is modeled on one or more computer systems connected to the printer 100. To achieve the desired characteristics of the object to be printed, such as its solidity, density, elasticity, color, size, for example, optimal or target print parameters or constraints are determined, indicating, among other things, the materials and process for jetting thereof. The target print parameters may include, for example, material ratio, molar ratio, speed, droplet size, and target pattern, among other parameters. A formulation of two or more materials is calculated to achieve the desired characteristics of the object. The materials may include two or more reactive materials and one or more UV-curable materials. In some embodiments, determining the optimal or target print parameters includes calculating types and amounts of additives to add or incorporate into one or more of the materials of the formulation, to obtain the desired characteristics of each material and, thereby, of the formulation and printed object. For instance, additives (or additive materials) can include pigments, nanoparticles, fibers and other polymers known to those of skill in the art. Moreover, for example, as known to those of skill in the art, pigments can be added to the materials to cause the printed object to have a desired or optimal color; and nanoparticles can be added to the materials to define and/or change their resulting properties or characteristics (e.g., physical, thermal, mechanical, biochemical, optical, electrical) and, thereby, the resulting properties of the printed object. Calculating the types and amounts of additives is performed prior to jetting the material and completing the printed object. For example, the types and amounts of additives can be calculated during or in response to the modeling of the object to be printed. In other words, the modeling process can build in or account for additives of the materials, and model the object for printing accordingly. Alternatively (or additionally), the modeled object can be analyzed to determine the materials, and additives for the materials, in order to accurately and optimally print the object as modeled.

Once the target print parameters have been identified and the formulation has been calculated, printing is initiated based on the target print parameters. As described in further detail below, the droplets may be jetted in accordance with one or more calculated and/or predetermined target patterns that are designed to achieve the target print parameters. It should be understood that, in some embodiments, a target pattern refers to the spatial layout of jetted materials transmitted for printing. Although in some embodiments herein only a single target pattern is described in connection with printing processes, a person of skill in the art will understand that a single pattern can be used to generate a portion of the resulting object and, in some instances, multiple patterns can be used when ejecting materials in a single layer or when ejecting materials into multiple layers during printing of a multi-layered object. Although exemplary manners (e.g., patterns) for ejecting materials are described below, a person of skill in the art will understand that any number of materials can be ejected in a variety of patterns that can be calculated and configured to achieve desired or optimal characteristics in the ejected materials and/or the resulting object. That is, the target pattern can be any pattern known to those of skill in the art in which jetted materials are arranged in a complementary pattern such that (1) areas in which one material is not jetted are filled with other jetted materials, and (2) completed layers are jetted that result in a fully printed object matching the modeled object. In other words, one or more target patterns that are calculated and used to eject materials to create a printed object are, in some embodiments, configured to achieve a partition of unity, meaning that the same material and/or non-reactive materials do not overlap in either the X, Y, or Z axes.

Furthermore, it should be understood that complementary patterns need not have proportional jetting of each material. For instance, in a two-material printing process, the ratio of one material to another can be 50:50 but can also be of any other non-equal ratios (e.g., 10:90; 90:10; 15:85; 85:15; 40:60; 60:40, etc.). A complementary arrangement of the target printing pattern can be provided for relative to the X, Y and/or Z axes, for instance, to achieve partition of unity as described above. In some instances, the target pattern may be designed to optimize (e.g., maximize or preserve) certain characteristics or parameters such as molar ratio and/or interaction area among jetted materials. Non-limiting examples of patterns configured to optimize these features include patterns that, among other things: (1) achieve an optimal interaction area between or among the jetted materials while preserving a given molar ratio (e.g., relative to a portion or region where the materials are ejected); (2) achieve an optimal molar ratio between or among the jetted materials; and/or (3) achieve an optimal molar ratio and interaction area between or among the jetted materials. Not only are ratios of most any value achievable in a two material process in view of the present disclosures, but ratios of most any value can likewise be achieved using more than two materials as well.

One non-limiting example of a predetermined or computed pattern is a checkerboard pattern. FIG. 2 illustrates droplets of materials A and B having been jetted via nozzles 111a and 111b onto multiple layers 115a, 115b, 115c, 115d atop a build platform 113. As shown, materials A and B have been jetted in a pattern which has been determined to be the target pattern for achieving, among other things, the desired reaction and printed object. In a shifting checkerboard pattern, the material jetted by each droplet is different than (and thus reactive with) the material jetted in adjacent positions within the same layer as well as adjacent layers.

The droplets may be jetted layer by layer, starting with a layer closest to or adjacent to the build platform 113, in accordance with the target pattern. The droplets may be layered starting at a proximal position (as shown) of the carriage 105 and printheads 109a and 109b on the bridge 103b. The droplets may be jetted one printhead at a time, or they can be jetted simultaneously from different printheads, so long as the desired constraints are achieved, including, for example the target molar ratio. The droplets can continue to be jetted according to the determined configuration until a single layer is completed. The carriage 105 and printheads 109a, 109b can be returned to the initial proximal position, and the build platform may be lowered distally in the Z-axis such that the next layer of droplets can be jetted on top of or above the previously jetted layer. This process repeats until all of the desired droplets of material have been jetted in accordance with the target print parameters. Although this portion describes a layer being printed before moving to another layer, in other embodiments only a portion of a layer may be printed before moving to another layer, and then the remaining portion of the first-printed layer can be added to later in the printing process. In other words, technically any portion of any layer can be printed at any time, and thus it is not necessary to complete printing one layer before moving to the next. Of course, in some instances it may be desirable to print one layer before moving to the next.

It should be understood that, as described below in further detail, corrective printing can be performed after a desired or predetermined number of droplets or layers have been jetted. Corrective printing may include performing processes configured to ensure that errors in printing are minimized and/or eliminated. The corrective process may be triggered or enabled by real-time (or substantially real-time) feedback regarding the printed object. In some embodiments, an imaging device 106, such as an optical coherence tomography (OCT) device that is movably attached to the bridge 103b (e.g., attached to the carriage 106 which is movably attached to the bridge 103b) is used for corrective printing. That is, the imaging device 106 may capture images of the material being jetted and/or object being printed. Such images may be used, in real-time, to perform additional corrective printing or modify the printing parameters of the droplets and/or layers that remain to be jetted.

Notably, a person skilled in the art will recognize components of the printer 100 such as the motion system 103, printhead 109a and 109b, nozzles 111a and 111b, energy source 107, imaging device 106, build platform 113, and others are by no means limited by the particular descriptions provided for herein. The illustrated embodiments are merely some exemplary configurations of such components. A person skilled in the art, in view of the present disclosures, would understand how to implement other configurations of such components in conjunction with the teachings provided for herein to arrive at other printers and printing devices without departing from the spirit of the present disclosure. Other configurations, other components and sub-components of the various parts, and even other devices capable of achieving the same results as the motion system 103, printhead 109a and 109b, nozzles 111a and 111b, energy source 107, imaging device 106 and build platform 113 are contemplated in view of the present disclosures.

Formulation

In some embodiments described herein, the printer 100 is configured to fabricate three-dimensional polyurethane objects by inkjet printing. Of course, as discussed above, the systems and methods described herein can be used with other printers and/or materials, including printers and materials known to those of skill in the art. The materials to be jetted by the printer typically conform to a number of constraints associated with the printer, printhead, and/or nozzle configurations. For example, in some embodiments, in order for the material to be jettable via inkjet printheads, the material must be within an allowable viscosity range at operating temperature. Similar constraints may be imposed on the surface tension of the materials to be jetted. One such non-limiting example is that the surface tension for inkjet-based ink be approximately in the range of about 20 mN/M to about 45 mN/M. It should be understood that formulations of reactive materials, or reactive materials together with UV-curable materials, can be printed in accordance with the embodiments described herein. The materials to be used for printing may be manually selected by operating a three-dimensional printing device or computing system connected thereto, or can be dynamically selected by the printing device or connected computing device based on data received in a print command.

A formulation for polyurethane that can be jetted by inkjet printheads will now be described in detail. Polyurethane may be prepared with two reactive materials, also referred to as parts A and B, indicating parts of an overall formulation: one part isocyanate and one part hydroxyl, amine or both hydroxyl and amine. As mentioned above, parts A and B may interchangeably be referred to herein as materials A and B. Parts A and B are shown as jetted droplets in FIGS. 1 and 2. The jetted droplets may correspond to voxels represented in the digital model of the object. The properties of the resulting polyurethane can be driven by numerous factors including molecular weight of polyol, molar ratio of isocyanate and hydroxyl, reaction temperature, and post-processing techniques. For the polyurethane to be jettable via some exemplary inkjet printheads, the viscosity of part A and part B typically should not exceed a desired range, such as about 5 centipoise to about 15 centipoise (cPs) at operating temperature. In some embodiments, to achieve such a viscosity fluids such as part A and part B of the polyurethane formulating, their operating temperatures are driven (e.g., heated, cooled) to a precalculated optimal or required temperature that enables their ejection through the nozzles of the printer at an optimal rate. The heating of the chambers and/or formulation parts can be performed at a time prior to the ejection of the formulation parts, including, in some instances, immediately prior to their ejection. As known to those of skill in the art, the optimal operating temperature can vary depending on various factors such as the type of material and the desired ejection rate. Nonetheless, in some embodiments, the operating temperature is higher than room temperature.

Part A, which is a first part or material of the polyurethane formulation includes an isocyanate functional group. The isocyanate functional group may include one or more of the following:

Monoisocyanate: one isocyanate functional group in each molecule, such as diphenylmethane monoisocyanae, cyclohexane monoisocyanate, etc.;

Diisocyanate: two isocyanate functional groups in each molecule such as toluene diisocyanate (TDI), methylene bis(phenylisocyanate) (MDI), xylyene diisocyanate (XDI), hexamethylene diisocyanate (HDI), methylene bis(4-cyclohexylisocyanate) (HMDI), isophorone diisocyanate (IPDI), napthalene diisocyanate (NDI), etc.;

Polyisocyanate: each molecule contains multiple isocyanate functional groups such as Bahonat HA3000, etc.;

Other molecules that contain isocyanate functional group, such as dimers, or oligomers of isocyanates; or The mixture of above mentioned isocyanate functional group containing molecules.

Other materials that fall within the purview of an isocyanate functional group and are suitable for use in conjunction with the present disclosures will be known to those having skill in the art in view of the present disclosures.

Part B, which is a second part or material of the polyurethane formulation includes functional groups that are reactive with isocyanate functional groups, such as those described in connection with part A. For instance, part B may include one or more of the following:

Hydroxyls containing materials such as (1) small molecules with hydroxyls functional group, such as ethylene glycol and 1,4 butanedio; (2) polyols, such as polyester diol, polyether diol, polycarbonate diol, and other kinds of polyols; or (3) a mixture of (1) and (2);

Amine containing materials such as (i) small molecules with amine functional group, such as ethylene diamine and 1,4 butanediamine; (ii) polyamines, molecules containing two and more amine functional groups; or (iii) a mixture of (i) and (ii); or Mixture of hydroxyl containing materials and amine containing materials.

In some embodiments, to achieve a desired reaction rate between parts A and B used to formulate polyurethane, a catalyst may be added to each of the parts. For instance, the catalyst may be dibutyltin dilaurate (DBTDL) or tertiary amines. The amount of catalyst may be limited to a certain threshold, for example, of approximately two (2) weight percent (wt %). However, it should be understood that the catalyst threshold in each part may depend on the reactivity of the parts, such that the higher reactivity between the parts necessitates a lower concentration of catalyst. The desired amount of catalyst can be determined and mixed with each of the parts prior to the parts being deposited or stored in respective chambers. In alternative embodiments, a catalyst chamber can be provided in fluid communication with multiple chambers for storing formulation parts (e.g., first chamber and second chamber for part A and part B of the formulation), such that a catalyst can be added to one or more of the parts.

When calculating the formulation for polyurethane described herein, or any other formulation of reactive materials or parts for three-dimensional printing, the reaction rate between the materials is preferably fast enough to form a desired solid or semi-solid object. More specifically, the reaction rate typically should be fast enough such that the next layer can be laid down or jetted atop the most recently printed layer without undue wait time. As described above, possible delay in printing the next layer can be reduced and/or eliminated by providing a heater (e.g., fluid heater) that can be used to accelerate the reaction process between the materials or parts. In some embodiments, one or more heaters (e.g., fluid heaters) can be provided to heat the chambers that store or contain the formulation parts. Thereby, the heater or heaters can be activated in a manner that is configured to heat the formulation parts in the chamber or chambers to desired or optimal operating temperatures. The reaction time between the materials should nonetheless be sufficiently long at room temperature so that the materials or parts can diffuse into each other before curing and thus allow for the full co-reaction between material to occur. The formulation of the material may therefore consider the target curing rate between the materials or parts, to achieve desired printing efficiency and amount of diffusion. In some embodiments, the curing rate is optimized when formulating a material or parts of a material, such as part A and part B. Non-limiting examples of factors that may be considered for optimization of the curing rate include one or more of:

Temperature (in some embodiments, a higher temperature leads to a higher reaction rate);

Catalyst content (in some embodiments, a higher catalyst content leads to a higher reaction rate); and Functional groups of the materials (in some embodiments, amine-based materials react faster than hydroxyl-based materials, a first amine/hydroxyl reacts faster than a secondary amine/hydroxyl, and an aromatic isocyanate is more reactive than an aliphatic isocyanate).

Figure 5:
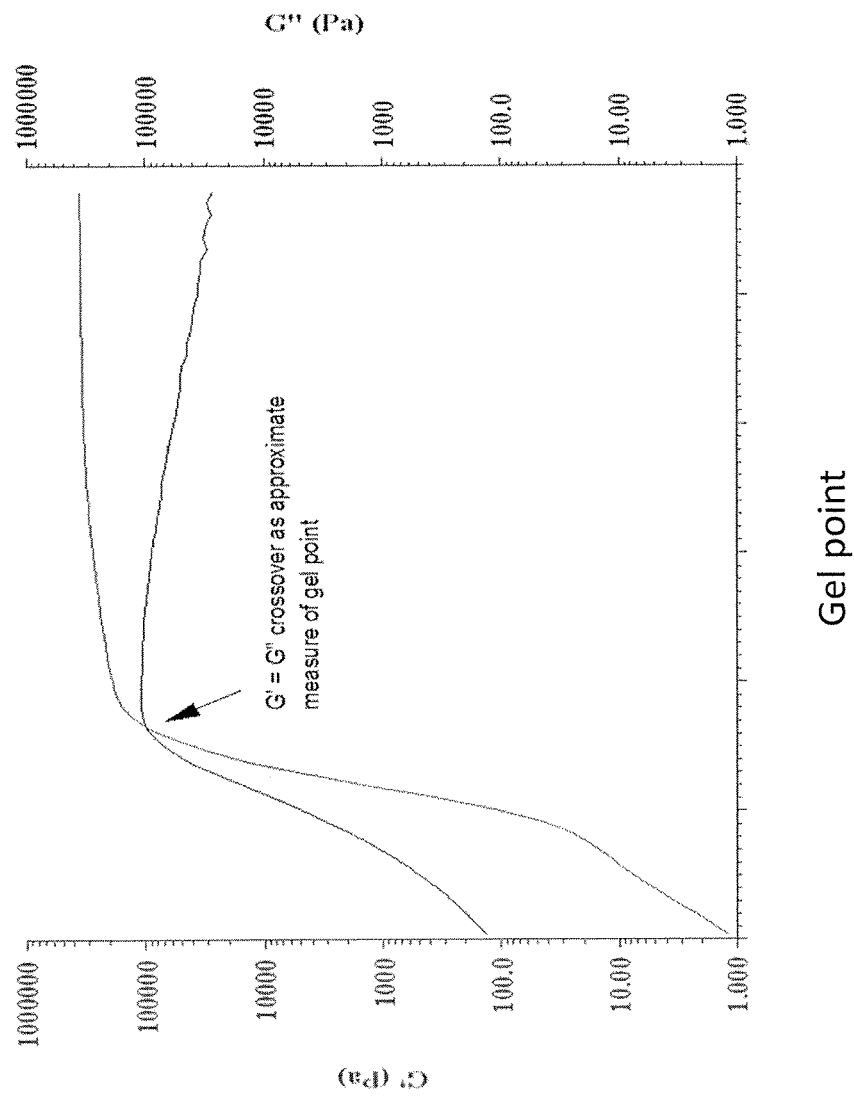
FIG. 5 is a diagram illustrating one exemplary gel point that results from one exemplary embodiment of a three-dimensional printing device.

As described above, the formulation to be used for printing is configured to generate a desired solid or semi-solid object. The formulation is therefore composed such that the reactivity of the parts in combination with others of the target print parameters results in a sufficiently solidified material above a desired threshold. In some embodiments, the floor of a semi-solid polyurethane is measured by rheological behavior at which the elastic modulus G' equals the viscous modulus G". FIG. 5 illustrates an exemplary relationship between an elastic modulus and a viscous modulus for a material formulated in view of the present disclosures, indicating the point at which the formulation becomes a gel or semi-solid in one exemplary embodiment. In the illustrated embodiment, the starting material, which is a mixture of part A and part B, is a low viscous liquid. Thus, as shown, both the elastic modulus and viscous modulus are very low at the start of the reaction. As the reaction of the parts proceeds, the viscosity of the formulation quickly increases such that both the elastic modulus and viscous modulus increase accordingly. As shown in the example, the elastic modulus increases faster than the viscous modulus. The crossover point illustrated in FIG. 5 indicates a point during the increase of the elastic modulus and the viscous modulus at which they are equal to one another, i.e., the gel point. The formulation is considered to be a gel or semi-solid when the crossover point is reached.

Printing Process

As described in further detail above, the printing techniques can be performed using a variety of printing mechanisms and material formulations. In some embodiments, a two part polyurethane formulation is printed using two inkjet printheads of an inkjet printer such as printer 100. Though, as mentioned above, multiple parts or materials can be jetted one at time through the same printhead.

In preparing to print, the formulation and dispensation thereof is determined and configured such that the ratio of each jetted material or part when mixed and/or diffused with one another results in a desired molar ratio. The molar ratio between the parts of a resulting printed material can have a significant effect on the quality and mechanical properties of the resulting material and printed object. In some embodiments, the ratio of materials or parts that are jetted at each droplet in a two-part formulation in order to achieve the desired molar ratio can be 1:1. Controlling the ratio of jetted materials may be done by adjusting the size of each nozzle to modify the amount of material dispensed in a single droplet or dot. A person skilled in the art will understand a variety of ways by which a nozzle size can be adjusted, including by adjusting the size of a single nozzle and swapping one nozzle having one size for another nozzle having another size.

The jetting of each material or part can be arranged and performed in accordance with a desired or predetermined pattern in order to achieve a maximum reaction between the materials or parts. In some embodiments, the formulation is generated such that achieving the desired molar ratio between the materials or parts results, at least in part, from maximizing the reaction between the materials or parts. Maximizing the reaction between the materials or parts may be done by maximizing the surface area interaction between droplets of the material or part.

More specifically, to maximize the reaction and/or surface area interaction, the materials or parts may be jetted in accordance with a desired optimal pattern, such as: a checkerboard pattern, a shifting checkerboard pattern, a pattern computed using a numerical optimization, an error diffusion-based pattern, a pattern computed using any of the above-mentioned patterns, or other patterns known to those skilled in the art in view of the present disclosures. Such patterns can include patterns with equal and/or non-equal ratios of each material (e.g., material A=x %, material B=(100−x) %), and/or patterns in which jetted droplets or elements are of equal and/or non-equal sizes (e.g., size of material A droplet=x % of printing area, size of material B droplet=(100−x) % of printing area), meaning that different droplets or elements can occupy or amount to different areas or volumes. In some instances, a pattern may change during the printing process, such that multiple patterns are employed during the same printing process.

The non-limiting, exemplary checkerboard pattern may be a pattern in which, in each layer, two parts interact with each other at every printed droplet. An example of the checkerboard pattern in one layer is shown in FIG. 2. As illustrated, within each layer, such as layer 115a, the two parts A and B interact with each other at every jetted droplet. Of course, the number of droplets with which each droplet may interact with can vary, based on their location in the layer. For example, as shown, a perimeter droplet of part A located at the proximal end of the layer 115a interacts solely with a single droplet of part B, while the droplet B may interact with multiple part A droplets.

The non-limiting, exemplary shifting checkerboard pattern may be a pattern in which droplets of parts interact with each other within a layer but also interact with droplets of the other parts in adjacent prior and subsequent layers. An example of the shifting checkerboard pattern is shown in FIG. 2. As illustrated, droplets within a single layer such as layer 115b interact with each other at every jetted droplet. Additionally, the droplets within a single layer such as layer 115b interact with droplets of the other part in other adjacent layers such as layer 115a and 115c. The shifting checkerboard pattern differs from the checkerboard pattern in that the checkerboard pattern does not shift each layer so that droplets of different parts interact with one another. Again, it is noted that the checkerboard and shifting checkerboard patterns are merely two illustrative examples of many different patterns that can be used to print in view of the present disclosures.

The pattern computed using a numerical optimization is a pattern that is optimized to maximize the three-dimensional surface area interaction between parts or materials while maintaining the desired molar ratio. An algorithm may be provided for calculating the optimal pattern to print a three-dimensional object. The algorithm's inputs may include desired object volume, actual object volume, desired molar ratio, actual object's molar ratio, and droplet size, among other inputs. In some embodiments, the algorithm is designed to achieve two exemplary objectives: (i) maximizing the interaction area between parts or droplets, while (ii) minimizing the difference between the actual printed object's molar ratio and the desired molar ratio, as represented by the following function:

$$\min \alpha SA_D + |R_M - R_T| \qquad (1),$$

where $\alpha$ is a parameter that controls the relative importance of each of the two objectives, $SA_D$ is a measurement of the surface area between adjacent droplets of different material, $R_M$ is the mix ratio, and $R_T$ is the target mix ratio such that the difference between $R_M$ and $R_T$ is a non-negative number that corresponds to the difference between a target mix ratio and an actual mix ratio averaged in a spatial neighborhood. The minimum being determined is throughout a volume of the object. In some embodiments, the pattern can be optimized using different types of optimization algorithms known to those of skill in the art. Non-limiting examples of optimization algorithms include simulated annealing, graph cuts, hill climbing, and the like. The optimization algorithm determines or outputs the placement of the material droplets in the object volume to achieve the desired objectives.

An alternative exemplary way of describing the objectives of function (1) above is:

$$\max SA_D \text{ subject to } R_M = R_T \qquad (2),$$

where the maximum is being determined throughout a volume of the object. In the pattern formulation shown in function (2), the actual mix ratio $R_M$ averaged in a spatial neighborhood is equal to the target mix ratio $R_T$, thereby acting as a hard constraint. In such a case, only the surface area between adjacent droplets of different material is maximized. In some embodiments, minimizing the difference between the actual mix ratio and the target mix ratio is achieved by using digital halftoning algorithms. For example, digital halftoning patterns that also maximize surface area between adjacent droplets of different material can be used. Another non-limiting example is to employ error diffusion algorithms, in which the volume is traversed in a predefined pattern. The quantization residual is distributed to neighboring volume elements or droplets that have not yet been processed in accordance with a pre-defined kernel. Unprocessed volume elements or droplets refers to those volume elements or droplets for which the material has not yet been determined.

The error diffusion-based pattern is a pattern designed to represent a discrete mixture of parts or materials, in order to satisfy formulated and/or desired volume ratios between the parts.

As stated above, other patterns may include patterns that are computed using one or more methods previously described herein or known to those of skill in the art in view of the present disclosures. Such other patterns may be designed to account for measured and calibrated volume differences when jetting each part or material with a given printhead.

To assist with and/or speed up the reaction between parts, an energy source, heater (e.g., fluid heater), or a heated substrate or support structure, which are described in further detail above, may be provided. In some embodiments, the heating of the parts can be performed after a threshold number of layers have been jetted and/or output, or based on the materials being jetted, to ensure that optimal heating and or reaction of the parts is achieved.

In some embodiments, printing a single object may include printing in multiple patterns. Each pattern used during the printing of an object may be selected, by way of non-limiting example, based on the type of material to be jetted. For example, an object may be printed using three materials: two reactive materials used to generate polyurethane, and a UV-curable material. The two reactive materials may be printed in a calculated pattern such as those described herein and/or known to those of skill in the art, including the non-limiting, exemplary checkerboard pattern or the like, while the UV-curable material is printed in a different pattern such as a non-checkerboard pattern. Heating may be controlled accordingly, such that if the reactive materials do not benefit from or require heating, heat can be provided in a way that delivers heat to the curable material only.

Corrective Printing

As described above, during a three-dimensional printing process, a corrective process can be performed to eliminate errors in previously-printed layers. In some embodiments, the printed area may be scanned and analyzed to identify differences or errors relative to the desired model input for printing. Scanning for errors can be performed, for example, using an imaging device such as OCT device 106. Images obtained from the OCT device 106 may be captured at desired intervals or print milestones, and analyzed in real-time to identify how to correct the errors.

In some embodiments, after a desired number of layers (e.g., 1, 10, etc.) have been printed, the printer 100 performs a scan of the surface of the in-progress printed object, for example, using the OCT device 106. The obtained images and/or data is compared to the modeled object input for printing (as the object is modeled at a time period matching the progress of the in-progress object) to identify differences between them. The identified differences between the actual printed object and its model can be used to generate a corrective layer to be printed. The corrective layer may be a new layer or an adaptation/modification of the next layer or layers to be printed. The corrective layer is thus designed to compensate for any identified differences or errors. In turn, the printing can continue without propagating errors such that the final printed product substantially matches the model input for printing.

One skilled in the art will appreciate further features and advantages of the disclosure based on the above-described embodiments. Accordingly, the disclosure is not to be limited by what has been particularly shown and described, except as indicated by the appended claims. All publications and references cited herein are expressly incorporated herein by reference in their entirety.

What is claimed is:

1. A method for printing in three dimensions, comprising:
    ejecting a first fluid from a first nozzle onto a surface, the first fluid including a first material;
    ejecting a second fluid from a second nozzle towards the surface, the second fluid including a second material that is configured to react with the first material to form a printed material; and
    repeating the steps of ejecting the first fluid and the second fluid in layers to form an object,
    wherein the first fluid and the second fluid are formulated and ejected such that the molar ratio between the first fluid and the second fluid substantially meets a target molar ratio, and
    wherein after the first and second fluids are ejected from first and second nozzles, the resulting printed material solidifies so that the formed object is solid,
    the method further comprising:
    prior to a first iteration of the steps of the ejecting the first material and the second material, operating a controller to calculate a pattern for ejecting the first material and the second material,
    wherein the steps of ejecting the first and second materials are performed in accordance with the pre-calculated pattern.

2. The method of claim 1, wherein a catalyst is included as part of at least one of the first fluid and the second fluid.

3. The method of claim 1,
    wherein the printed material is polyurethane,
    wherein the first material comprises an isocyanate functional group, and
    wherein the second material comprises at least one of a polyol functional group that is reactive with the isocyanate functional group, an amine that is reactive with the isocyanate functional group, a hydroxyl that is reactive with the isocyanate functional group, and a mixture of any of a polyol functional group, an amine, and a hydroxyl, the mixture being reactive with the isocyanate functional group.

4. The method of claim 1, wherein each of the first and second fluids is solvent-free.

5. The method of claim 1,
    wherein ejecting a first fluid from a first nozzle onto a surface further comprises ejecting a first fluid from a plurality of first nozzles onto a surface, and
    wherein ejecting a second fluid from a second nozzle towards the surface further comprises ejecting a second fluid from a plurality of second nozzles towards the surface.

6. The method of claim 1, further comprising:
    operating a controller to adjust at least one of a droplet size of at least one of the first or second fluids ejected from the respective first or second nozzle, or a printing pattern that results from ejecting the first and second fluids to optimize a contact area of the printed object.

7. The method of claim 1, further comprising:
    operating a feedback loop to analyze a geometry of the printed material in real time; and
    generating a compensation layer of material to compensate for errors identified in the operating step.

8. The method of claim 1, wherein the pattern for ejecting the first and second materials is calculated to optimize at least one of one or more of a molar ratio and an interaction area between droplets of the first material and droplets of the second material among a number of layers.

9. The method of claim 8, wherein the pattern is calculated to optimize at least one of:
    (i) the interaction area between the droplets of the first material and the droplets of the second material, and preserve a given molar ratio between the droplets of the first material and the droplets of the second material;
    (ii) the molar ratio between the droplets of the first material and the droplets of the second material; and
    (iii) the molar ratio and the interaction area between the droplets of the first material and the droplets of the second material.

10. The method of claim 9, wherein the pattern is calculated such that the molar ratio between the droplets of the first material and the droplets of the second material is not 50:50.

11. The method of claim 9, wherein the pattern for ejecting the first and second materials is a checkerboard pattern.

12. The method of claim 9, wherein the pattern for ejecting the first and second materials is a shifting checkerboard pattern.

13. The method of claim 1,
    wherein ejecting a first fluid from a first nozzle onto a surface results in the formation of a first layer, and
    wherein ejecting a second fluid from a second nozzle towards the surface results in the formation of a second layer.

14. The method of claim 1,
    wherein ejecting a first fluid from a first nozzle onto a surface results in the formation of a first layer, and
    wherein ejecting a second fluid from a second nozzle towards the surface results in the second fluid being added to the first layer.

15. The method of claim 1, further comprising heating the layers of the first and second fluids after the first and second fluids have been ejected from the respective first and second nozzles.

16. The method of claim 1, wherein the height of the object is at least about 1 millimeter.

17. The method of claim 1, a combined molecular weight of the first fluid and the second fluid is less than a molecular weight of the printed material that results after the first and second materials react together.

18. The method of claim 1, further comprising ejecting a third fluid from a third nozzle towards the surface, the third fluid include a third material that is an ultraviolet (UV)-curable material.

19. The method of claim 18,
    wherein the first and second fluids are printed according to a first pattern and the third fluid is printed according to a second pattern.

20. The method of claim 1, wherein the first fluid and the second fluid are formulated to achieve a target reaction rate between the first fluid and the second fluid.

21. The method of claim 1, further comprising:
adding one or more additives to one or more of the first material and the second material prior a first iteration of the steps of ejecting the first fluid and the second fluid.

22. The method of claim 21,
wherein the one or more additives are configured to define one or more characteristics of the resulting printed material, and
wherein the one or more characteristics include at least one of physical, thermal, mechanical, biochemical, optical, electrical, or color properties.

23. The method of claim 1, wherein the pattern for ejecting the first and second materials is calculated to optimize an interaction area between droplets of the first material and droplets of the second material among a number of layers.

* * * * *